(12) United States Patent
Kato et al.

(10) Patent No.: US 6,531,047 B1
(45) Date of Patent: Mar. 11, 2003

(54) SURFACE MODIFICATION METHOD FOR AN ALUMINUM SUBSTRATE

(75) Inventors: Takamitsu Kato, Tokyo (JP); Mitsugi Maekawa, Tokyo (JP); Yuichi Hyakusoku, Tokyo (JP); Tadao Tokushima, Kanagawa (JP); Masaaki Kato, Kanagawa (JP)

(73) Assignee: Mediken Inc., Tokyo (JP)

( * ) Notice: Subject to any disclaimer, the term of this patent is extended or adjusted under 35 U.S.C. 154(b) by 0 days.

(21) Appl. No.: 09/588,225

(22) Filed: Jun. 6, 2000

(30) Foreign Application Priority Data

Jul. 30, 1999 (JP) ............................ 11-218237
Apr. 12, 2000 (JP) ....................... 2000-111056

(51) Int. Cl.⁷ ............................................... B05D 5/00
(52) U.S. Cl. .............................. 205/222; 134/2; 134/3; 134/41; 205/220; 205/223; 427/343; 427/353; 427/367
(58) Field of Search ................. 205/220, 221, 205/222, 223, 742, 746; 427/343, 353, 367; 134/2, 3, 41

(56) References Cited

U.S. PATENT DOCUMENTS

| | | | | |
|---|---|---|---|---|
| 5,814,157 A | * | 9/1998 | Mizuniwa et al. | ........... 134/1.2 |
| 5,997,717 A | * | 12/1999 | Miyashita et al. | .......... 205/466 |
| 6,129,100 A | * | 10/2000 | Kitagawa et al. | ............. 134/61 |
| 6,130,150 A | * | 10/2000 | Merchant et al. | ........... 438/618 |
| 6,132,572 A | * | 10/2000 | Kim | .......................... 204/253 |
| 6,210,748 B1 | * | 4/2001 | Nagahara et al. | ........... 427/108 |

* cited by examiner

Primary Examiner—Nam Nguyen
Assistant Examiner—William T Leader
(74) Attorney, Agent, or Firm—Oblon, Spivak, McClelland, Maier & Neustadt, P.C.

(57) ABSTRACT

A surface modification method for an aluminum substrate, which comprises treating a Ni—P plated aluminum substrate with a functional water having a plus or minus oxidation-reduction potential for a predetermined period of time in a washing step after a polishing step of the Ni—P plated aluminum substrate.

4 Claims, 11 Drawing Sheets

INDENTATION HARDNESS OF THE SUBSTRATE SURFACE

Ni-P TREATED WITH AN ANODE WATER CONTAINING 0.04 mM OF HCl FOR 3 MIN

EXTRACTION RATIO OF ELEMENTS BY TREATMENT OF Ni-P PLATED SUBSTRATE WITH FUNCTIONAL WATER

CHANGE IN BINDING ENERGY BY TREATMENT OF Ni-P PLATED SUBSTRATE WITH FUNCTIONAL WATER

SURFACE MODIFICATION METHOD FOR AN ALUMINUM SUBSTRATE

BACKGROUND OF THE INVENTION

1. Field of the Invention

The present invention relates to a surface modification method for an aluminum substrate (inclusive of an aluminum alloy substrate) having Ni—P (nickel-phosphorus) plating applied thereto, which is used mainly for hard disks or the like as memory media for computers. More particularly, it relates to a method for modifying the surface so that the corrosion resistance and hardness of the substrate be improved to meet requirements for a low flying height of e.g. a GMR (Giant Magnetic Resistive) head.

2. Discussion of Background

Heretofore, an aluminum substrate having Ni—P plating applied on its surface (hereinafter referred to as a Ni—P plated aluminum substrate) has been widely employed as a magnetic disk substrate. However, along with recent high densification of HDD, a low flying height of a magnetic head and a low noise of a medium have been required, whereby flatness of the substrate surface and an improvement of a modified layer on the substrate surface by polishing, have been strongly demanded. In HDD drive, a conventional MR head has been used at a flying height within a range of from 400 to 600 angstrom (hereinafter represented by A). However, a GMR head has now been used at a flying height of not more than 300 A for high density recording. In magnetic recording, spacing between the head and the medium gives a substantial influence over the recording and reproducing characteristics. A change in the spacing by 10% or more is likely to bring about an error in recording and reproduction. Therefore, with HDD having a flying height of 300 A, it has been required to suppress the maximum projection height of the medium surface to be at most 50 A.

Further, in order to satisfy the requirements for high densification of HDD, a super finish substrate has been widely used wherein the average roughness Ra and the maximum projection height Rt of the substrate surface are from 10 to 5 A and from 100 to 50 A, respectively.

In order to increase the surface hardness, an aluminum substrate for a magnetic recording medium usually has Ni—P plating coated in a thickness of about 10 $\mu$m on its surface. In its production process, plating is carried out in a thickness of about 12 $\mu$m by electroless plating, followed by polishing for 2 $\mu$m to obtain a necessary surface precision. Then, a washing step by means of a surface active agent or supersonic cleaning is carried out to remove abrasive grains, etc., and all aluminum substrates are inspected and then shipped. Accordingly, if the performance during the inspection is maintained until the sputtering of a magnetic film, there will be no problem in the yield in the production of magnetic recording media.

The Ni—P plating on the aluminum substrate is usually carried out by the following process. Namely, Ni—P can not directly be plated on an aluminum substrate. Therefore, the aluminum substrate is processed into a predetermined shape and subjected to removal of strain, annealing, cleaning such as degreasing and then zincate treatment to form nuclei for electroless plating. This treatment is to deposit Zn on the aluminum substrate. Zn is deposited spottedly on the aluminum substrate, and Ni—P will be precipitated thereon by an action of local cells. Accordingly, at the initial stage in growth, Ni—P is not yet in the form of a film, and it forms a dense coating film for the first time when it has grown to a thickness of from 1 to 5 $\mu$m. This indicates a possibility that at the initial stage in growth, the electroless plating liquid is taken into growth defective portions. The electroless plating liquid contains sodium hypophosphite as a reducing agent, and a salt containing sodium such as sodium citrate as a buffering agent, and accordingly, if such a liquid remains in the plated coating film, it is likely to cause corrosion.

Industrial products can not be 100% faultless, and corrosion inevitably occurs. Therefore, for such Ni—P aluminum substrates, a useful period of time after the production has been prescribed. With a GMR low flying head, the maximum projection height is restricted to at most 50 A to secure the SN ratio of the medium and the running stability of the head, and a new measure has accordingly been required. The present invention is intended to satisfy such requirements.

When the surface of a material is subjected to mechanical processing, the surface of the material receives some action by the force effective during the processing, by the generated heat or by the action of e.g. a polishing liquid, and the surface layer of the finished side will have a layer modified by processing which is different in nature from the lower layer material and which extends to a certain depth from the outermost surface (Nikkei Gijutsu Tosho S59 "Surface Finish Polishing Technology").

In the case of a Ni—P aluminum substrate, the thickness of such a layer modified by processing is about 1 $\mu$m, as shown in FIG. 1. The layer modified by processing has micro cracks and is gelled by a reaction with the polishing liquid and very soft. FIG. 1 is characteristic curves showing the relation between the depth and the hardness of the surface as between a case where treatment with the functional water according to the method of the present invention was carried out and a case where no such treatment was carried out, to the Ni—P aluminum substrate.

Due to retention of the plating liquid at defective portions in the coating film and the layer modified by polishing processing, a Ni—P plated aluminum substrate will have projections formed by corrosion on the surface as the time passes after the production, by a washing treatment by means of a usual alkaline or acidic water. By the sputtering of a magnetic layer, the retained liquid is removed by heating under vacuum during the sputtering, and the sputtered magnetic film will cover the surface, whereby there will be no reaction with moisture, gas or the like in the air, whereby there will be no corrosion except for a peripheral portion which is hardly sputtered.

Therefore, substrate manufacturers have prescribed a limitation to the useful period of time of the substrates. However, in order to satisfy the requirements for the improvement of the SN ratio or for reduction of the flying height, the useful period of time is further shortened, and it has been required to take an industrial measure.

SUMMARY OF THE INVENTION

The present invention has been made under the above-mentioned circumstances, and it is an object of the present invention to provide a surface modification method for a Ni—P plated aluminum substrate, which makes stabilized production of an aluminum substrate possible for a magnetic recording medium suitable for a low flying height GMR head by suppressing corrosion due to the layer modified by processing and due to the alkaline liquid remaining at defective portions of the Ni—P plated aluminum substrate.

The present invention provides a surface modification method for an aluminum substrate, which comprises treating a Ni—P plated aluminum substrate with a functional water having a plus or minus oxidation-reduction potential for a predetermined period of time in a washing step after a polishing step of the Ni—P plated aluminum substrate.

Heretofore, a functional water such as ionized water or water having oxygen gas or hydrogen gas introduced therein, has been used for washing of semiconductors or washing of liquid crystal glasses. However, the majority is intended for washing to carry out e.g. removal of attached fine particles in an alkaline range where the oxidation-reduction potential (ORP) is minus, and it has been rare that a functional water is used for the purpose of surface modification.

The present invention is characterized by the use of a functional water having a plus or minus ORP.

It has been confirmed that by the use of such a functional water, it is possible to prolong the effective period of time which used to be a problem with conventional Ni—P plated aluminum substrates, and it is possible to obtain an improved effect for the yield in production by an improvement of the layer modified by processing.

DETAILED DESCRIPTION OF THE PREFERRED EMBODIMENTS OF THE INVENTION

As the functional water having a plus ORP, an acidic functional water having an ORP of from 300 to 1300 mV, preferably from 300 to 700 mV, and a pH of from 2 to 7, preferably from 4 to 7, can be employed. As the functional water having minus ORP, an alkaline functional water having an ORP of −500 to −800 mV, and a pH of 7 to 10 can be employed. In such a functional water, the Ni—P plated aluminum substrate after the final polishing step, is immersed for treatment for a predetermined period of time, and then it is washed with pure water and then dried, whereby the surface of the Ni—P plated aluminum rate will be modified. Namely, the alkaline liquid remaining at defective portions of the Ni—P plated aluminum substrate will be removed, and corrosion of the Ni—P plated layer by polishing will be prevented.

The mechanism for the improvement in the corrosion resistance is as follows. Namely, while ionized water makes Ni—P passive to prevent elution thereof, anode water or cathode water lets Na or K elute from the plated substrate to prevent corrosion. This effect is strongest with the anode water and next with the cathode water. Usual acidic water or pure water dissolves the substrate quickly, and accordingly a fresh surface is always exposed on the surface, whereby no effect for preventing corrosion will be obtained.

Figure 9:
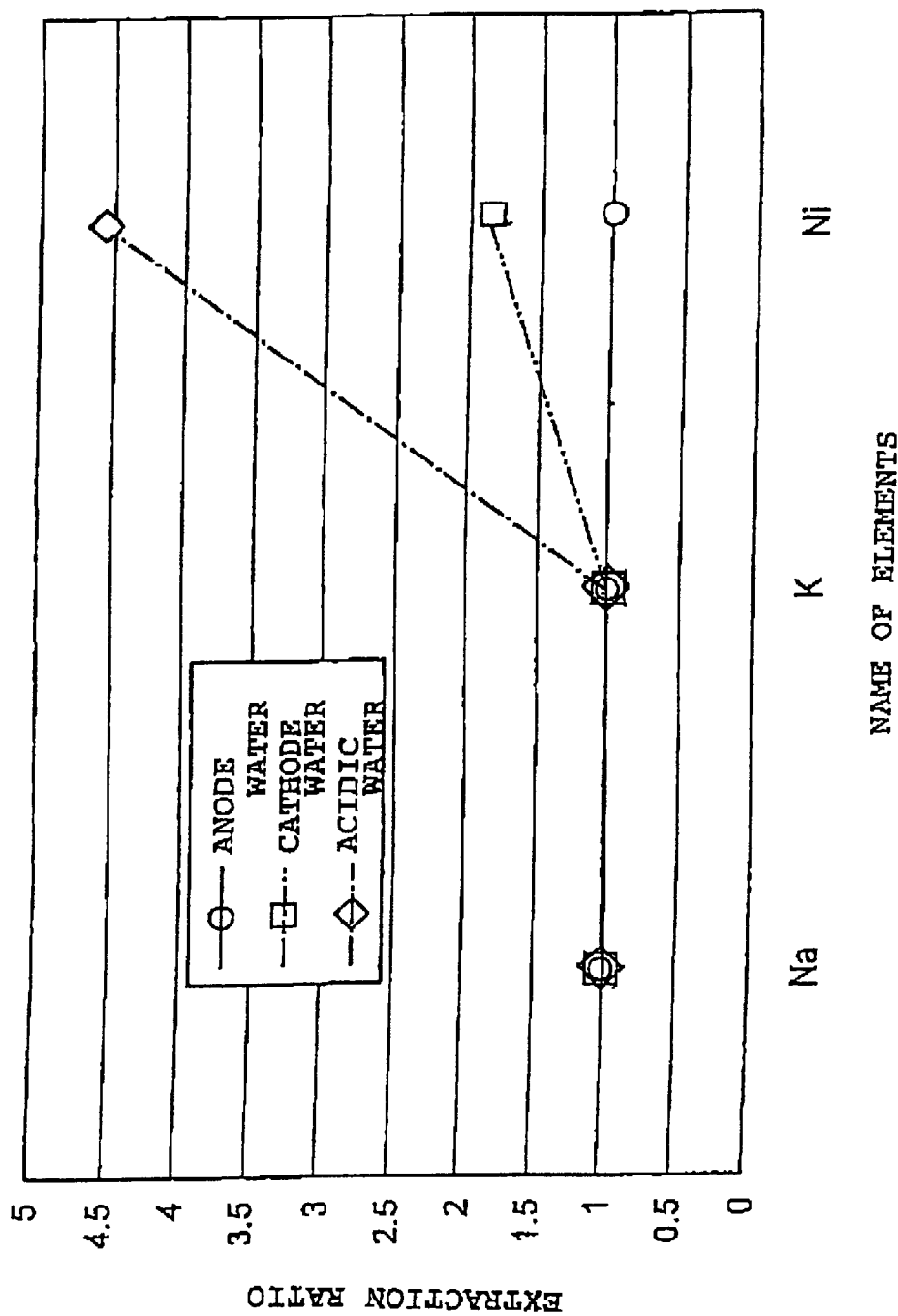
FIG. 9 is a graph showing the extraction ratios of elements by treatment of a Ni—P plated substrate with a functional water

FIG. 9 is a graph showing extraction ratios of elements of the substrate. Five substrates of 3.5 inches were immersed in 1 liter of a prescribed functional water for 24 hours, whereupon the concentrations of Na, K and Ni extracted, were measured and standardized based on the amounts in the anode water. As shown in the Figure, the degree of corrosion decreases in the order of usual acidic water, the cathode water and the anode water, and is smallest with the anode water.

When some deposits such as abrasive grains for polishing or other foreign matters are attached on the Ni—P plated aluminum substrate to be treated, such deposits may be removed by washing with a conventional functional water such as an alkaline functional water having a minus ORP, followed by treatment with an acidic functional water having a plus ORP of the present invention.

The treating conditions may suitably be selected depending upon the processing conditions such as the composition of the electroless plating liquid to be used, the type and size of abrasive grains for polishing and the type of the polishing liquid.

According to the present invention, the surface modification of the Ni—P plated aluminum substrate is accomplished by the following steps in the final washing process for the substrate having the flat surface roughness adjusted to a predetermined level by a final polishing process. In the following, an example will be described in which a functional water having a plus ORP is employed.

(1) Step of Removing Deposits

A Ni—P plated aluminum substrate is immersed in an alkaline functional water having a minus ORP and a pH of at least 8 and washed, if necessary, by an application of ultrasonic waves, to remove deposits such as abrasive grains for polishing and other organic substances, attached to the Ni—P plated aluminum substrate.

The functional water will bring the substrate and the deposits to the same electrical potential and thus provides a cleaning action by electrical repellency. In this respect, the same action is obtainable irrespective of the anode side or the cathode side. According, depending upon the type of the deposits, step (1) may be omitted.

(2) Step of Modifying the Surface

The Ni—P plated aluminum substrate having deposits removed by step (1), is immersed in an acidic functional water having a plus ORP for a predetermined period of time, followed by washing with pure water and then by drying.

When the electroless plating is carried out in an acidic bath, and the polishing is carried out in an alkaline bath, the effective range of ORP of the functional water to be used at the step of modifying in the present invention is from 300 to 1300 mV, preferably from 400 to 700 mV, and the effective range of the pH is from 2 to 7, preferably from 4 to 7.

If ORP is less than 200 mV, the ability for surface modification is weak, and it takes time for the treatment. On the other hand, if it exceeds 1300 mV, the surface tends to be oxidized. If the pH is less than 2, the substrate tends to be etched, and if it exceeds 7, the effect for modification tends to be weak.

When the electroless plating is carried out in an alkaline bath, and the polishing is carried out in an acidic bath, the effective range of ORP of the functional water to be used at the step of modifying in the present invention is from −500 to −800 mV, and the pH is from 7 to 10.

Now, the present invention will be described in further detail with reference to Examples. However, it should be understood that the present invention is by no means restricted to such specific Examples.

EXAMPLES

Using an electroless plating liquid, Ni—P was plated in a thickness of 12 $\mu$m on an aluminum 6063 alloy under the following conditions, followed by polishing for 2 $\mu$m by colloidal silica abrasive grains for polishing, to obtain a substrate having a surface roughness Ra of 4 Å, which was washed by an ultrasonic washing device containing a surfactant and then spin-dried. As a result of examinations including AFM, no projection due to corrosion was observed on the surface.

Plating liquid: electroless plating liquid (acidic bath), pH: 5, liquid temperature: 40° C.
Liquid composition (unit: g/l of water):

| Nickel sulfate | 30 |
|---|---|
| Sodium hypophosphite | 20 |
| Sodium acetate | 14 |
| Sodium citrate | 24 |
| Ammonium chloride | 5 |
| Lactic acid | 0.5 |

Abrasive (unit: g/l of water):

| Silicon dioxide | 30 |
|---|---|
| Sodium oxide | 0.6 |

This material was used as a standard sample, and non-treated one i.e. one subjected to no washing treatment with a functional water, was designated as sample No. 19. Among such samples, except for the non-treated one (sample No. 19), the rest of samples were subjected to washing treatments with functional waters under the following conditions.

The treating conditions are shown in Table 1.

TABLE 1

Substrate: Ni-P plated aluminum substrate

| Test No. | Type of washing water | Additive | Washing time 1 minute | 2 minutes | 3 minutes |
|---|---|---|---|---|---|
| ① | Cathode water | Nil | Sample No. 1 | Sample No. 2 | Sample No. 3 |
| ② | Cathode water | NH$_3$ 2/100 mol/l | Sample No. 4 | Sample No. 5 | Sample No. 6 |
| ③ | Ozone water | 1 ppm | Sample No. 7 | Sample No. 8 | Sample No. 9 |
| ④ | Ozone water | 10 ppm | Sample No. 10 | Sample No. 11 | Sample No. 12 |
| ⑤ | Anode water | Nil | Sample No. 13 | Sample No. 14 | Sample No. 15 |
| ⑥ | Anode water | HCl 4/100 mol/l | Sample No. 16 | Sample No. 17 | Sample No. 18 |
| ⑦ | Non treated water | | | Sample 19 | |

The pH and ORP of the functional waters (washing waters) in Table 1 are as follows.

| ① Cathode water | No additive | pH 7.8 | ORP −580 mV |
|---|---|---|---|
| ② Cathode water | NH$_3$ added | pH 10 | ORP −800 mV |
| ③ Ozone water | 1 ppm | pH 6.7 | ORP 1200 mV |
| ④ Ozone water | 10 ppm | pH 6.7 | ORP 1200 mV |
| ⑤ Anode water | No additive | pH 6 | ORP 550 mV |
| ⑥ Anode water | HCl added | pH 2 | ORP 1150 mV |

The Ni—P plated aluminum substrates were treated under the conditions of pH, ORP and immersion time prescribed in Table 1, followed by rinsing with pure water for 3 minutes and then by spin-drying. Samples of sample No. 1 to No. 18 obtained by the above tests were left to stand for 20 days in a clean room, whereupon a region of 20×20 $\mu$m was observed by AFM, and the number of projections and the maximum height of the projections were measured. The results of the measurements are as shown in Table 2.

TABLE 2

| Sample No. | 1 | 2 | 3 | 4 | 5 | 6 |
|---|---|---|---|---|---|---|
| Number of projections | 4 | 4 | 6 | 10 | 12 | 12 |
| Maximum projection height (Å) | 150 | 170 | 180 | 150 | 200 | 250 |

| Sample No. | 7 | 8 | 9 | 10 | 11 | 12 |
|---|---|---|---|---|---|---|
| Number of projections | 6 | 3 | 8 | 0 | 8 | 24 |
| Maximum projection height (Å) | 800 | 400 | 1100 | 0 | 100 | 600 |

| Sample No. | 13 | 14 | 15 | 16 | 17 | 18 | 19 |
|---|---|---|---|---|---|---|---|
| Number of projections | 0 | 0 | 0 | 65 | 25 | 15 | 45 |
| Maximum projection height (Å) | 30 | 0 | 0 | 900 | 800 | 600 | 300 |

Figure 2:
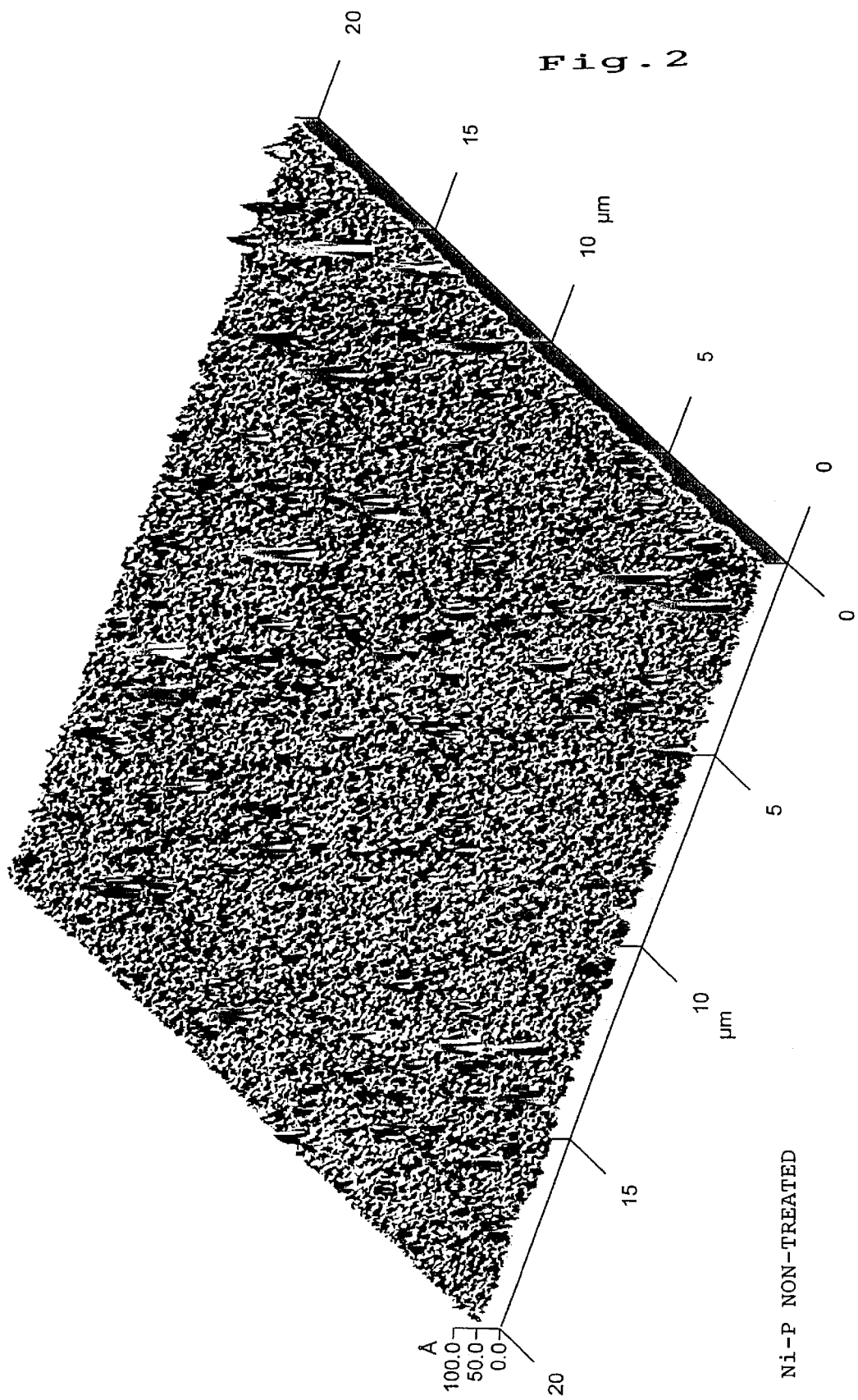
FIG. 2 is an AFM (Atomic Force Microscopy) photograph showing the surface metal structure of a Ni—P plated aluminum substrate in a non-treated state.
Figure 3:
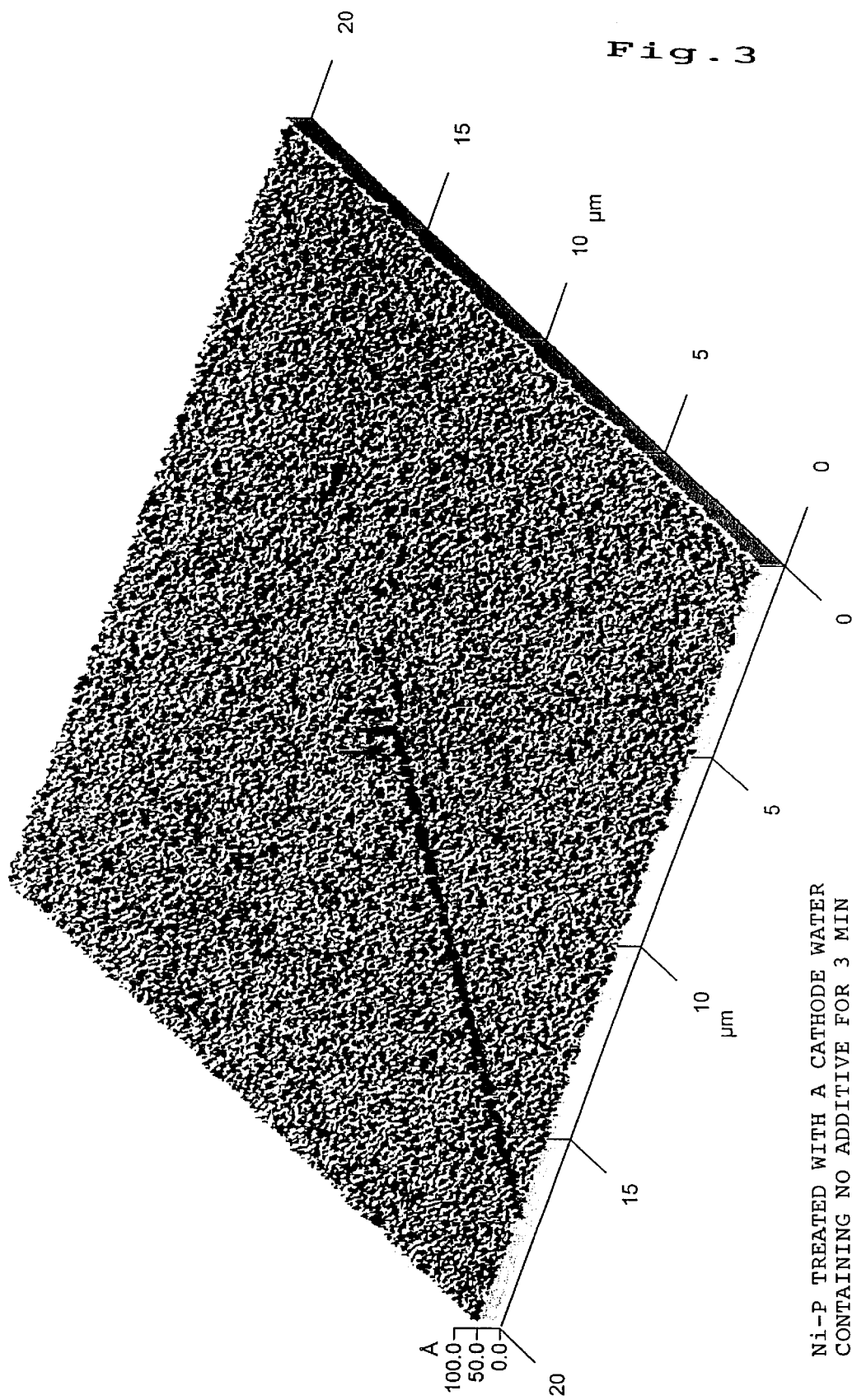
FIG. 3 is an AFM photograph showing the surface metal structure of a Ni—P plated aluminum substrate after treatment with a cathode electrolytic water (hereinafter referred to cathode water) containing no additive.
Figure 4:
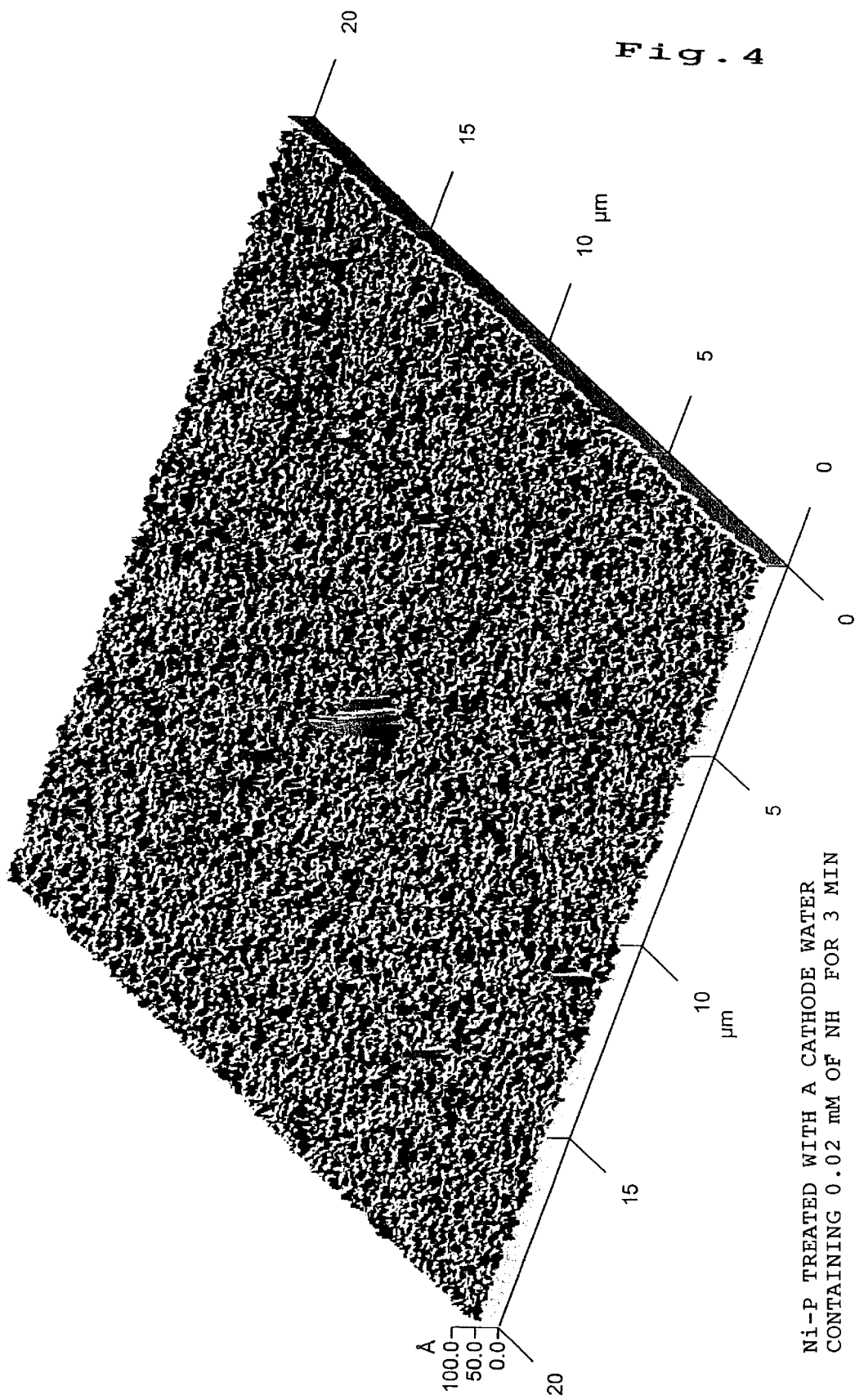
FIG. 4 is an AFM photograph showing the surface metal structure of a Ni—P plated aluminum substrate after treatment with a cathode water with an addition of $NH_3$.
Figure 5:
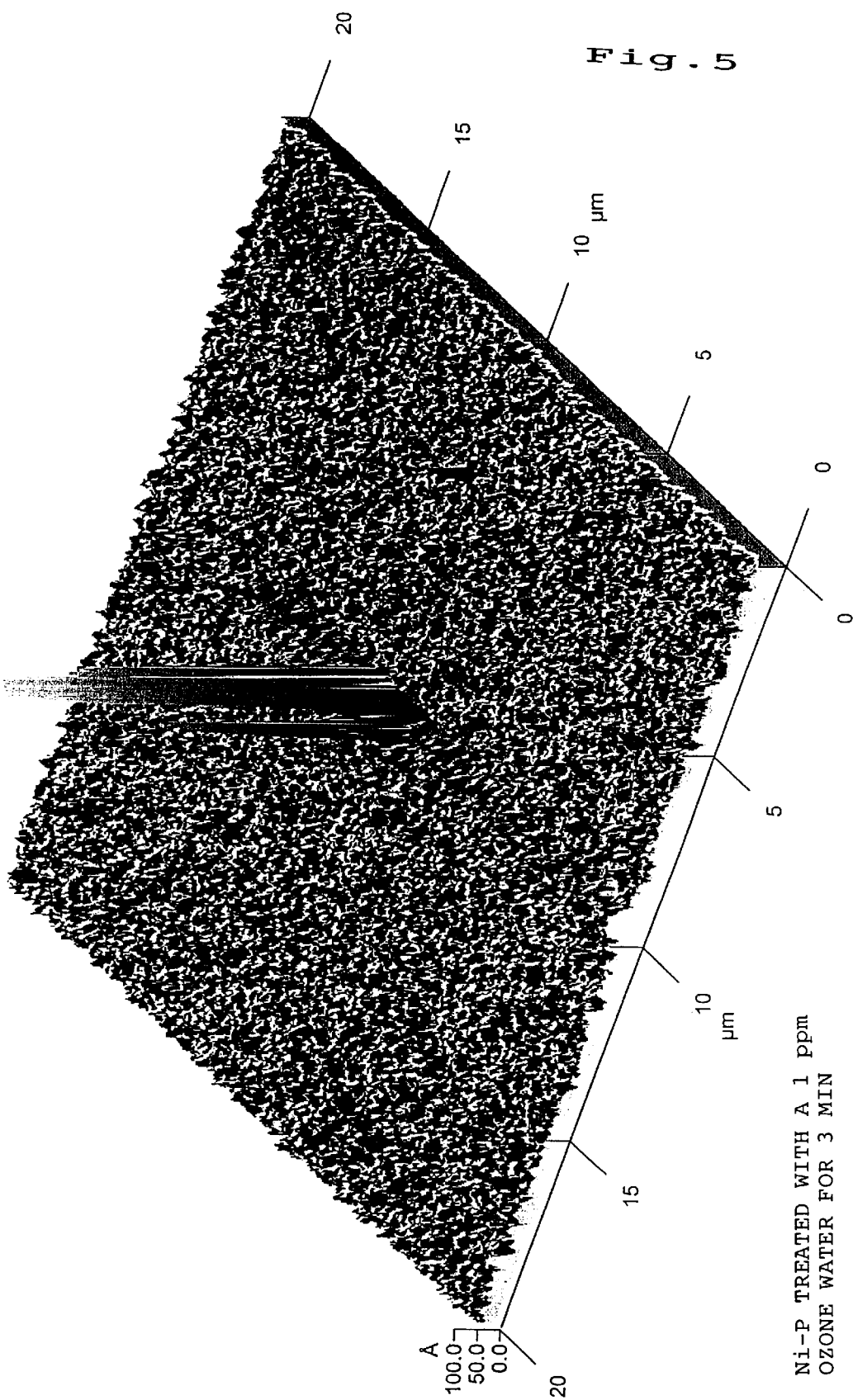
FIG. 5 is an AFM photograph showing the surface metal structure of a Ni—P plated aluminum substrate after treatment with a 1 ppm ozone water.
Figure 6:
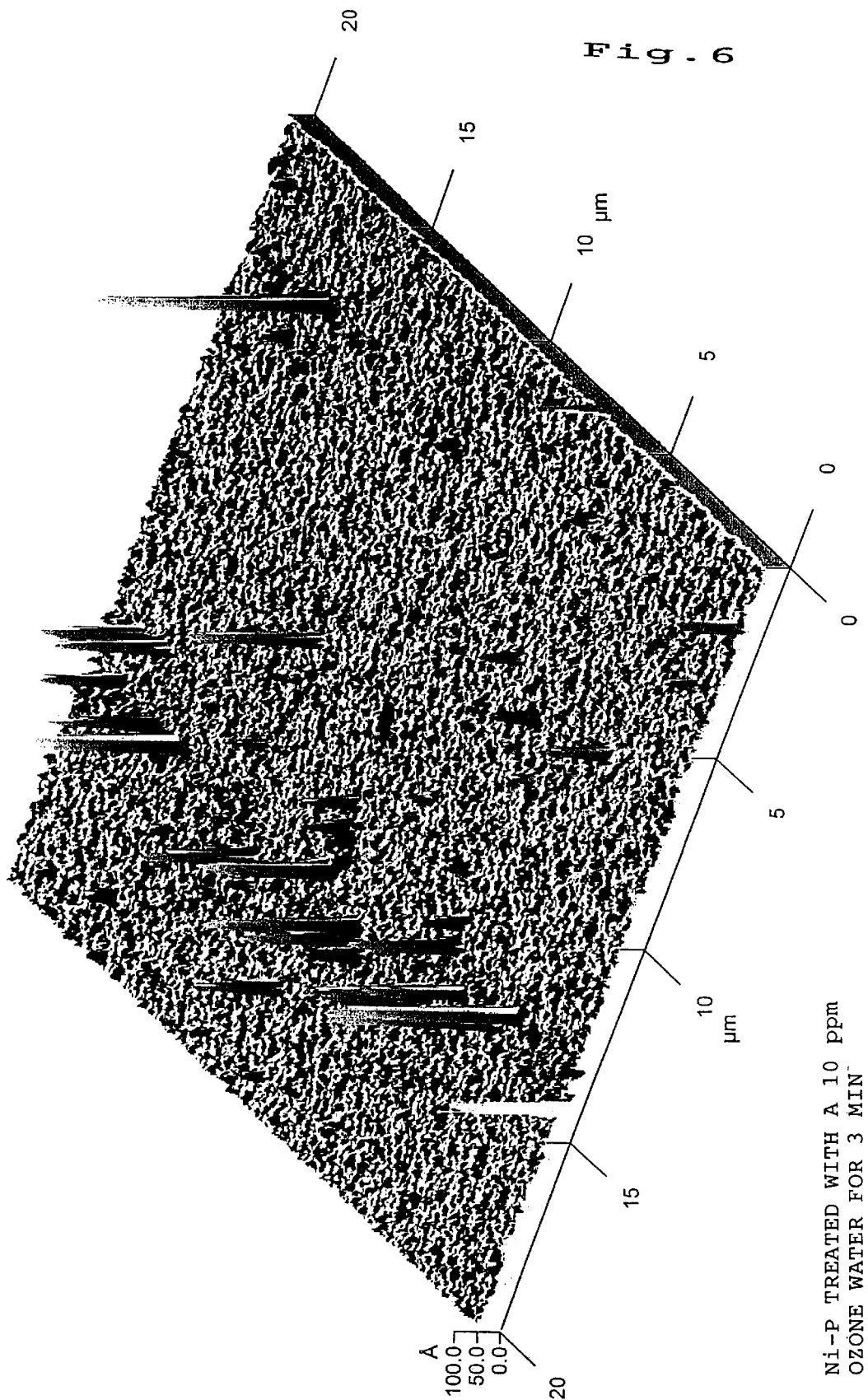
FIG. 6 is an AFM photograph showing the surface metal structure of a Ni—P plated aluminum substrate after treatment with a 10 ppm ozone water.
Figure 7:
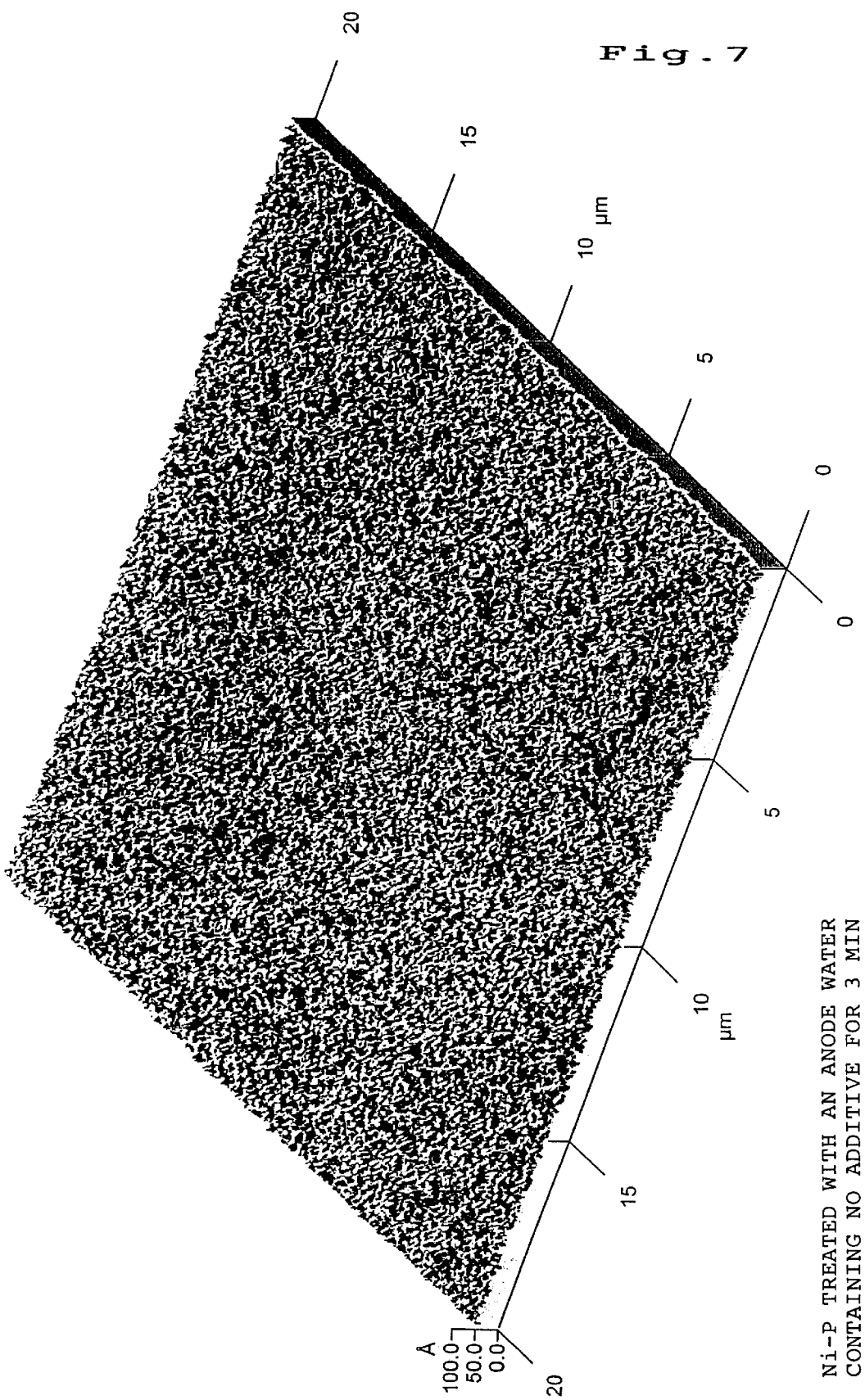
FIG. 7 is an AFM photograph showing the surface metal structure of a Ni—P plated aluminum substrate after treatment with an anode electrolytic water (hereinafter referred to anode water) containing no additive.
Figure 8:
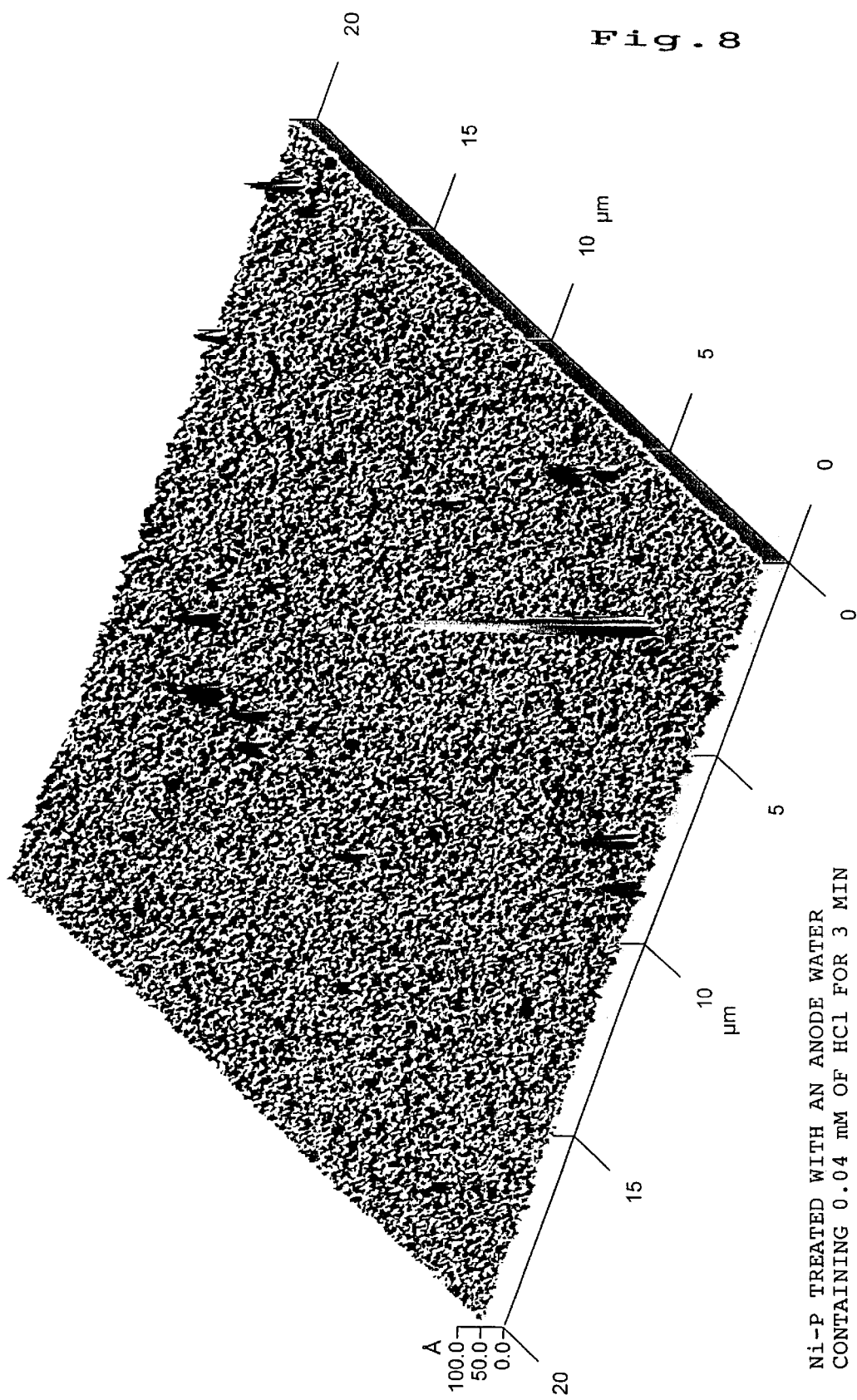
FIG. 8 is an AFM photograph showing the surface metal structure of a Ni—P plated aluminum substrate after treatment with an anode water with an addition of HCl.

Metal surface structures of typical aluminum substrates when Ni—P plated aluminum substrates were non-treated or treated with anode water, cathode water and ozone water, respectively, are shown by AFM photographs in FIGS. 2 to 8. FIG. 2 corresponds to sample No. 19 in Table 1, and FIGS. 3 to 8 correspond to sample Nos. 3, 6, 9, 12, 15 and 18, respectively, in Table 1. It is evident from Table 2 that sample Nos. 10, 13, 14 and 15 show excellent results with the number of projections being 0, and the maximum projection height being not higher than 50 A. Also sample Nos. 1 to 6 are far superior in smoothness as compared with conventional methods.

From the forgoing Examples, it is evident that in the method of the present invention, ORP is preferably from 400 to 700 mV, and the pH is preferably from 4 to 7.

The above Examples were carried out under certain conditions, and the optimum treating conditions with functional waters may change depending upon the electroless plating conditions and polishing compositions. When the electroless plating is carried out in an alkaline bath, and the polishing is carried out in an acidic bath, the optimum treating conditions with functional waters may be opposite with respect to ORP and the pH. When a functional water having a minus ORP is employed, ORP is preferably within a range of from −500 to −800 mV, and the pH is preferably from 7 to 10.

Anode and cathode electrolytic functional waters usually have smaller molecular sizes and readily penetrate into micro cracks of the Ni—P plated aluminum substrates and remove alkali components and other hazardous ions in the cracks by substitution effects. After the surface modification with the anode or cathode electrolytic water, no special reagent will be employed, which is economical as a special waste water treatment which will be required when a usual surfactant is employed, will not be required.

In the forgoing, the conditions and the effects for improving corrosion resistance by the treatment of Ni—P plated aluminum substrates with functional waters, have been described. Whereas, the conditions for improvement of the hardness by the treatment of Ni—P plated aluminum substrates with functional waters are such that the pH is within a range of from 8.0 to 11.0, and ORP is within a range of from −300 to −1200 mV. The ranges of the suitable conditions may change depending upon the relation with the treating time.

Figure 1:
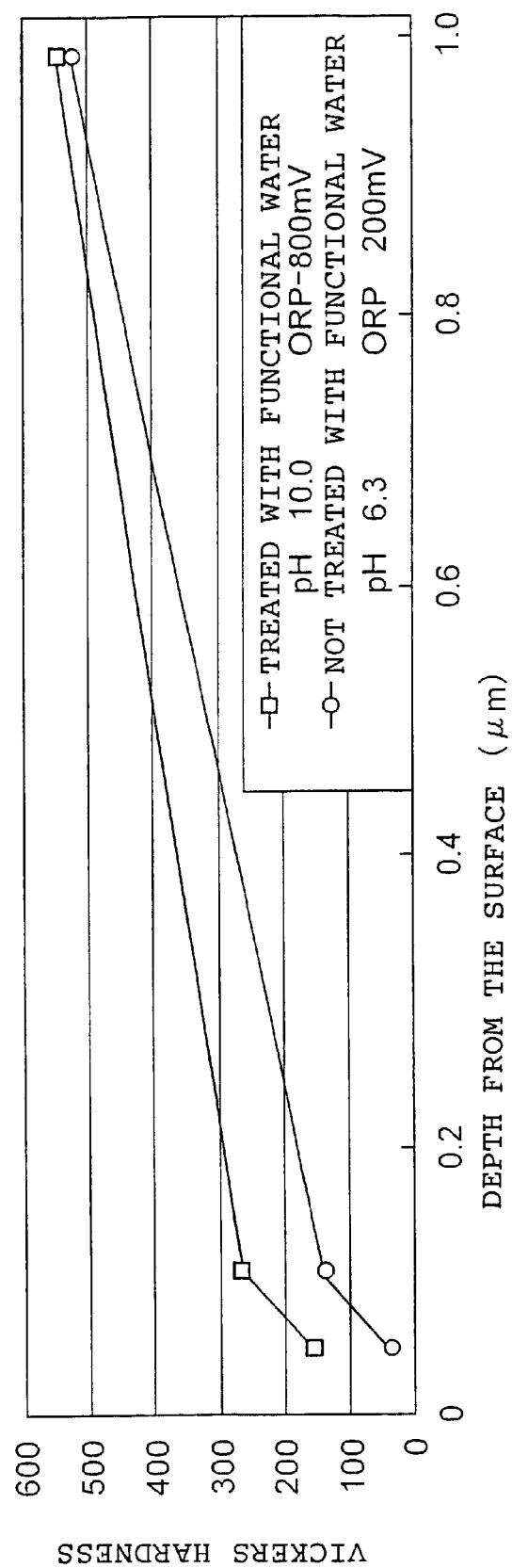
FIG. 1 is a graph showing the relation between the depth from the surface and the hardness as between a case where a Ni—P plated aluminum substrate was treated with a functional water and a case where the same substrate was not so treated.
Figure 10:
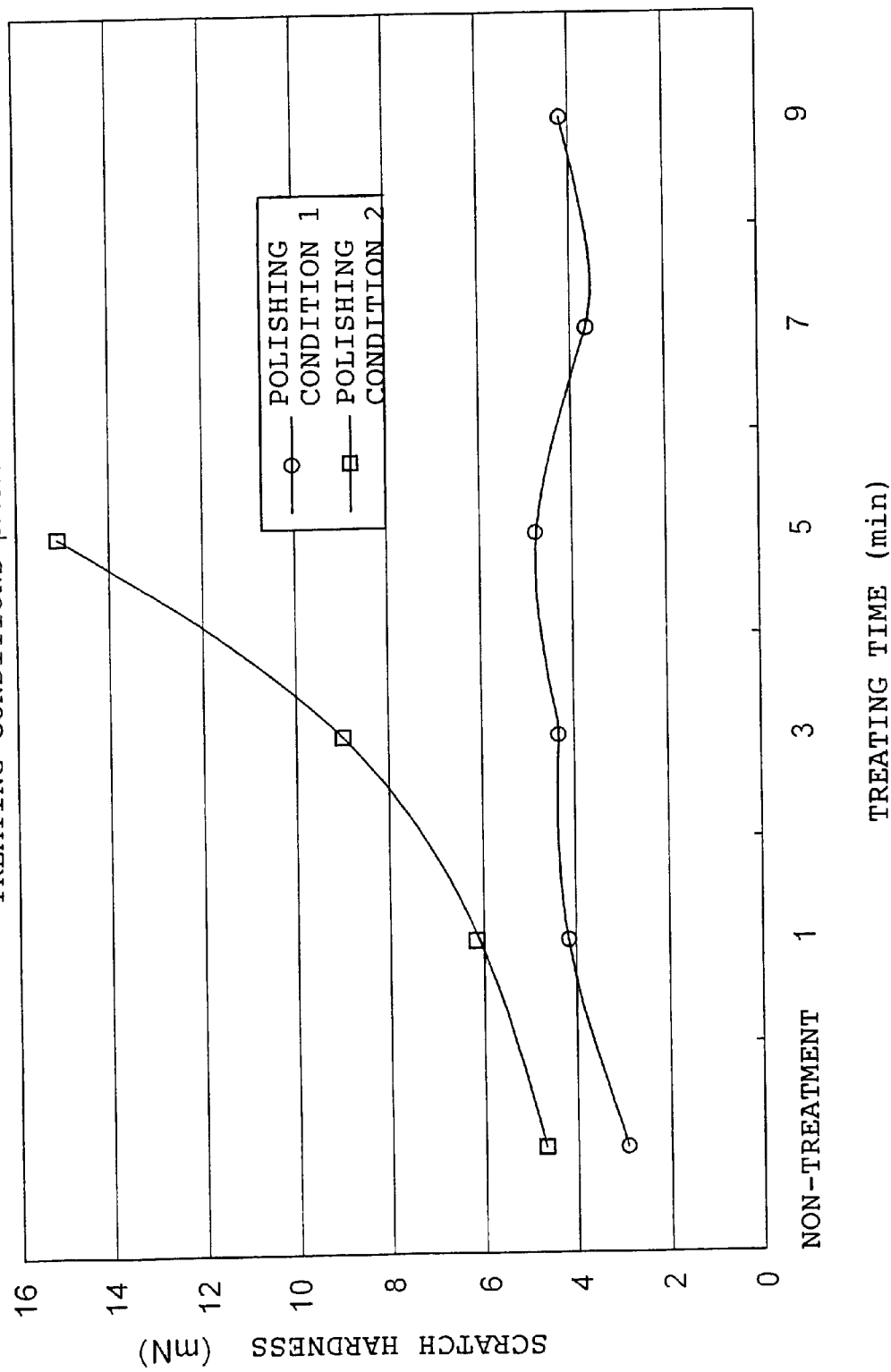
FIG. 10 is a graph showing the relation between the treating time and the hardness of the Ni—P plated substrate.
Figure 11:
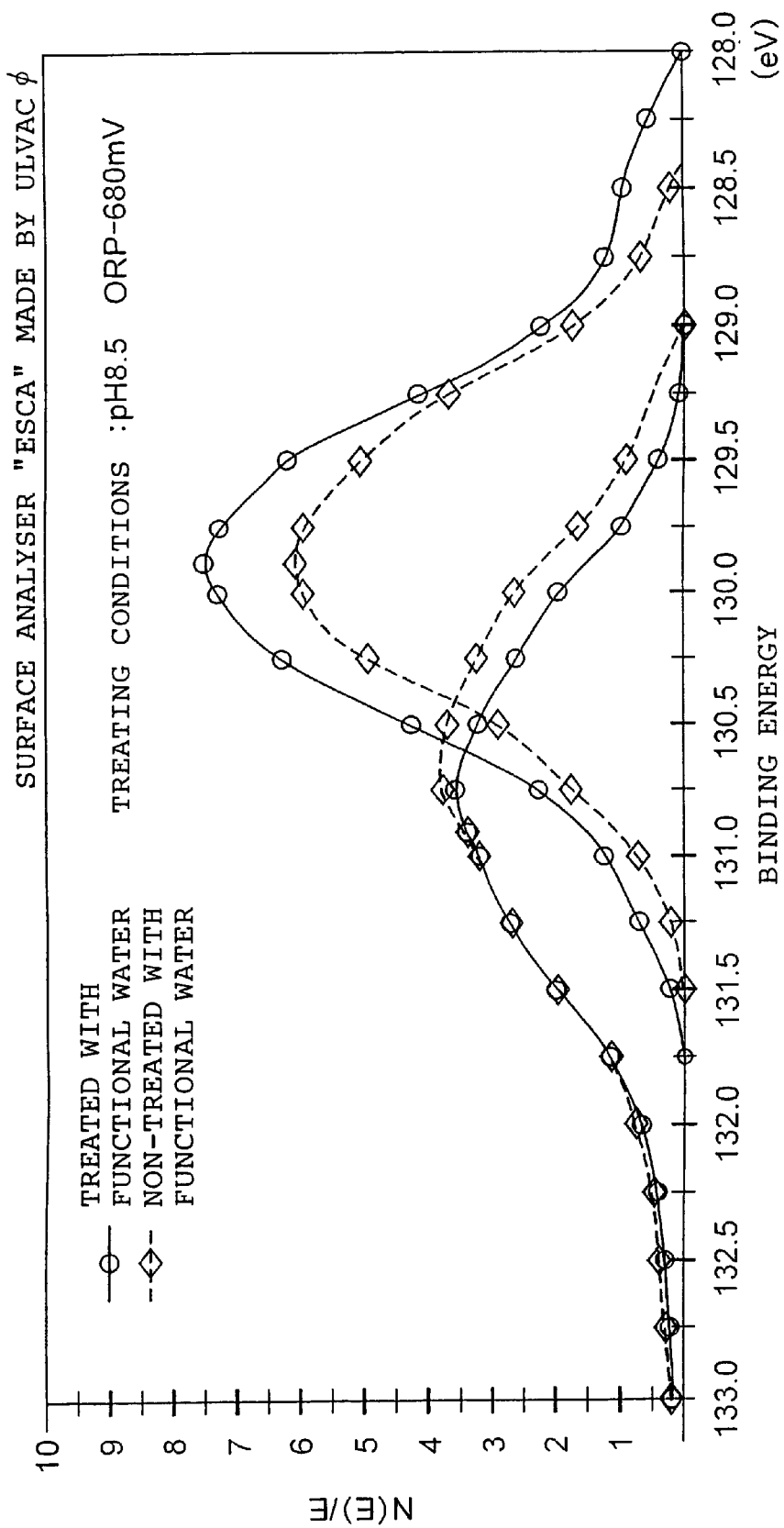
FIG. 11 is a graph showing the change in binding energy by treatment of a Ni—P plated substrate with a functional water.

FIG. 10 is a graph showing the relation between the scratch hardness and the treating time under treating conditions of one Embodiment. FIG. 11 is a graph showing the change in binding energy by the treatment of a Ni—P plated aluminum substrate with a functional water under the same treating conditions in comparison with the case where no treatment with a functional water was carried out, and it shows that the amount of the Ni—P plated aluminum substrate treated with the functional water is larger than the Ni—P plated aluminum substrate not treated with a functional water on the low binding energy side, i.e. the hardness of the treated substrate is improved. Further, as shown in FIG. 1, the hardness of a Ni—P plated aluminum substrate treated with a functional water having a pH of 10.0 and an ORP of −800 mV, is improved by about twice the hardness of a Ni—P plated aluminum substrate treated with conventional acidic water having a pH of 6.3 and an ORP of 200 mV in a depth of 0.05 $\mu$m from the surface.

As described in the forgoing, according to the surface modification method of the present invention, the hardness of the surface of a Ni—P plated aluminum substrate can be improved, and the corrosion resistance can be improved, and further, the number of projections on the surface is very small, and smoothness with the maximum projection height being not higher than 50 A is obtainable. Thus, it is possible to produce aluminum substrates suitable for low flying height GMR heads under a stabilized condition.

What is claimed is:

1. A surface modification method for an aluminum substrate, which comprises contacting a Ni—P plated aluminum substrate with an anode electrolytic water having an oxidation-reduction potential in a range of 300 to 1300 mV and a pH in a range of 2 to 7 for a predetermined period of time in a cleaning step after a polishing step to produce a corrosion resistant surface on the Ni—P plated aluminum substrate.

2. The surface modification method for an aluminum substrate according to claim 1, wherein the anode electrolytic water has the oxidation-reduction potential in a range of 300 to 700 mV and the pH in a range of 4 to 7.

3. A surface modification method for an aluminum substrate, which comprises contacting a Ni—P plated aluminum substrate with a cathode electrolytic water having an oxidation-reduction potential in a range of −500 to −800 mV and a pH in a range of 7 to 10 in a cleaning step after a polishing step to produce a corrosion resistant surface on the Ni—P plated aluminum substrate.

4. A surface modification method for an aluminum substrate, which comprises contacting a Ni—P plated aluminum substrate with a cathode electrolytic water having an oxidation-reduction potential in a range of −300 to −1200 mV and a pH in a range of 8 to 11 in a cleaning step after a polishing step to produce a mechanically strengthened surface on the Ni—P plated aluminum substrate.

\* \* \* \* \*